(No Model.)  3 Sheets—Sheet 1.
D. C. RIPLEY.
PNEUMATIC MACHINE FOR FORMING GLASSWARE.

No. 461,489. Patented Oct. 20, 1891.

Witnesses:
Raphaël Netter
G. B. Lewis

Inventor
Daniel C. Ripley
by
Kerr & Curtis
Attorneys (No Model.) 3 Sheets—Sheet 2.

D. C. RIPLEY.
PNEUMATIC MACHINE FOR FORMING GLASSWARE.

No. 461,489. Patented Oct. 20, 1891.

Witnesses:
Raphaël Netter
G. B. Lewis.

Inventor
Daniel C. Ripley
by Kerr & Curtis
Attorneys (No Model.) 3 Sheets—Sheet 3.

D. C. RIPLEY.
PNEUMATIC MACHINE FOR FORMING GLASSWARE.

No. 461,489. Patented Oct. 20, 1891.

Witnesses:
Raphaël Netter
G. B. Lewis

Inventor
Daniel C. Ripley
by
Kerr & Curtis
Attorneys.

UNITED STATES PATENT OFFICE.

DANIEL C. RIPLEY, OF PITTSBURG, PENNSYLVANIA.

PNEUMATIC MACHINE FOR FORMING GLASSWARE.

SPECIFICATION forming part of Letters Patent No. 461,489, dated October 20, 1891.

Application filed April 29, 1891. Serial No. 391,012. (No model.)

*To all whom it may concern:*

Be it known that I, DANIEL C. RIPLEY, a citizen of the United States, residing at Pittsburg, in the county of Allegheny and State of Pennsylvania, have invented a new and useful Improvement in Pneumatic Machines for Forming Glassware, of which the following is a specification.

It is customary in the operation of glass-presses using removable molds for the operator or presser to place the mold in position under the plunger by hand and after the article has been pressed to withdraw the mold from such position and invert it on the press-table for the purpose of discharging the article. This operation is repeated with each article. It is customary to provide guides or stops, against which the mold is placed, to bring it into the proper position below the plunger; but in the rapid operation of the press it more or less frequently happens that the presser does not use sufficient care in placing the mold against the guides and the plunger does not register perfectly therewith, but strikes one side and spoils the article or injures the mold. It is therefore very desirable to secure an accurate registration between the mold and the plunger, and this is one of the objects of my invention.

The foregoing remarks are also applicable to machines for blowing glassware in which a hollow blowing head or spindle is caused to engage the mouth of the mold for the purpose of closing and clamping the same and delivering thereto the air necessary for blowing the article.

The particular construction shown in the accompanying drawings and described in the following specification is designed for the manufacture of glass articles by first pressing a blank and then blowing it to the required shape, and the power used for the various operations of the machine is pneumatic pressure.

To enable others skilled in the art to make and use my invention, I will now describe it by reference to the accompanying three sheets of drawings, in which—

Figure 1:
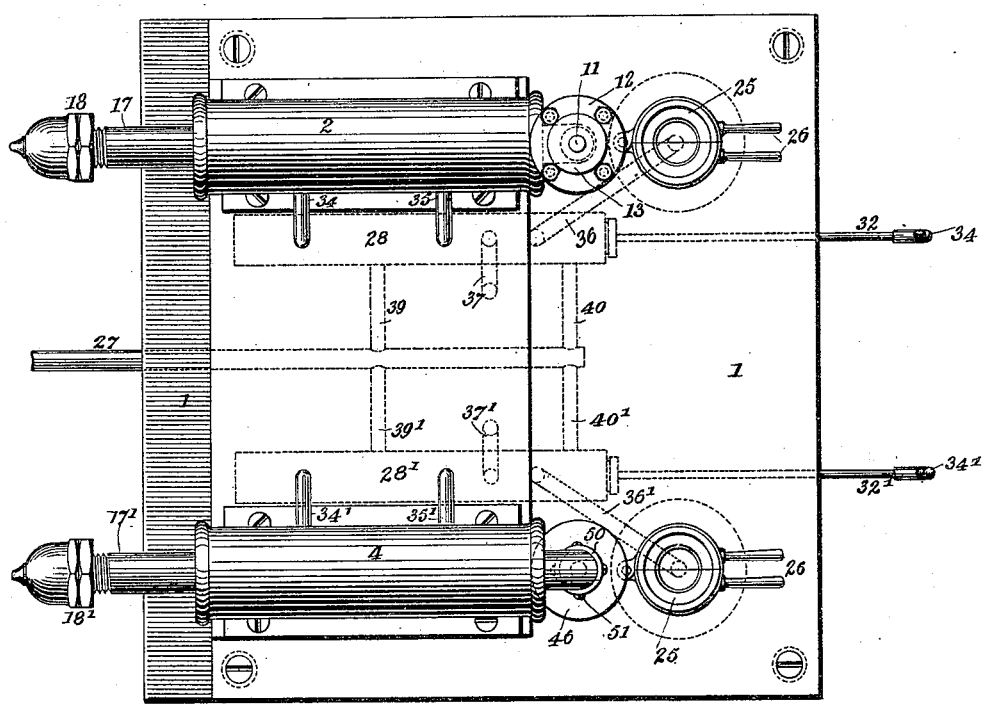
Figure 2:
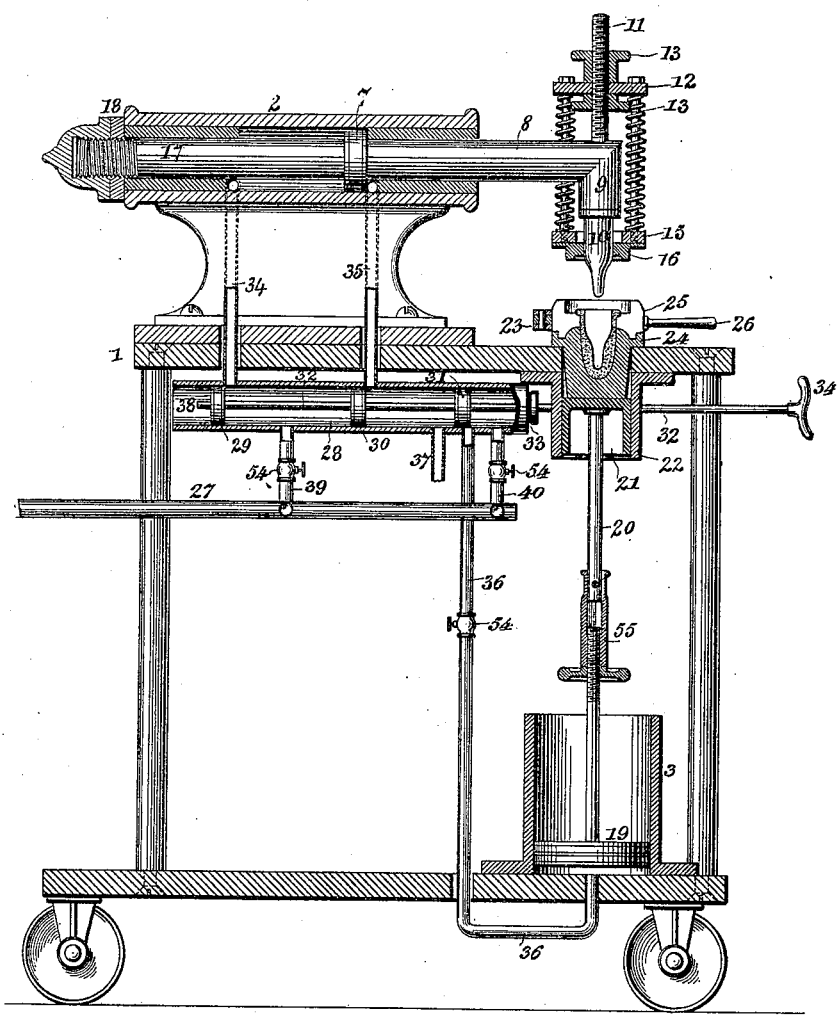
Figure 3:
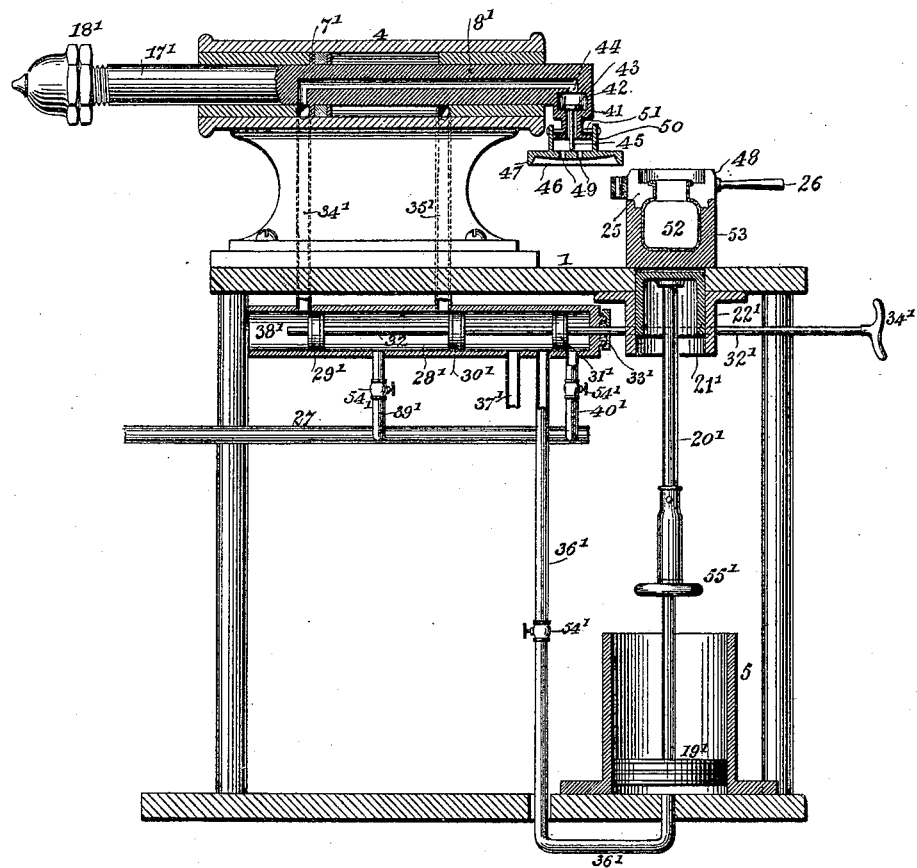
Figure 4:
Figure 5:

Figure 1 is a plan view of my improved machine. Fig. 2 is a vertical section showing the pressing-machine. Fig. 3 is a vertical section showing the blowing-machine; and Figs. 4 and 5 are side views of the molded blank and the completed article, respectively.

Like figures of reference indicate like parts in each.

Upon a suitable table or stand 1 are two pneumatic cylinders 2 and 4, the cylinder 2 being designed for operating the plunger of the press-mold and the cylinder 4 the spindle of the blow-mold. These cylinders are placed in a horizontal position and carry the plunger and spindle upon suitable heads at the outer ends of their piston-rods, the said plunger and spindle standing in a vertical position and being incapable of vertical movement.

Arranged on the lower part of the table, directly under the outer position of the plunger, is a vertical pneumatic cylinder 3, provided with a piston and a piston-rod for supporting and operating by a vertical reciprocating movement the press-mold, so as to force the mold upon or over the plunger for the purpose of pressing the article, in which operation the plunger is stationary and the necessary movements are made by the mold.

Directly below the outer position of the blowing-spindle there is a similar vertical pneumatic cylinder 5, having a piston and piston-rod for supporting and operating by a reciprocating vertical movement the blowing-mold and bringing it into position against the blowing-spindle, which, like the plunger, is incapable of vertical movement, the movements necessary for connecting and disconnecting it with the mold being made by the latter.

Referring now to Fig. 2, which shows and illustrates the operation of the pressing-machine, the cylinder 2 is provided with a piston 7, having a piston-rod 8, which extends through the front cylinder-head, and at its outer end has a vertical head 9, to the lower end of which the plunger 10 is secured. On the upper end of the head 9 is a vertical threaded stem 11, upon which a plate 12 is adjustably secured by means of lock-nuts 13. This plate supports the spring-plate 15 by means of the usual sliding rods surrounded by springs used in glass-presses generally, and the mold-ring 16 is secured to the spring-plate 15 in the usual way. The piston 7 is provided with a guide-rod 17, which extends back through the rear end of the cylinder, where it is threaded and provided with adjustable nuts 18 for the purpose of adjusting the stroke of the piston, so that the plunger-head 9 may be accurately placed with reference to the movements and shape of the mold with which it is used.

The mold-cylinder 3 is provided with a piston 19 and a piston-rod 20, on the upper end of which is a plate or head 21 for supporting the press-mold 23. This mold is composed of a lower section 24, which is preferably solid, and an upper section 25, which is preferably formed in two parts hinged together, being provided with handles 26 for opening and closing it.

A pipe 27, leading from an air compressor or reservoir, supplies compressed air at any desired pressure for the operation of the cylinders, and in any convenient position is a valve-box 28, in which are three valves 29, 30, and 31, all mounted on a rod 32, which extends through a stuffing-box 33 and terminates in a handle 34 at the front of the machine. The cylinder 2 is supplied with air from and is exhausted through the valve-box 28 by pipes 34 and 35, which are connected to the opposite ends of the cylinder, and the cylinder 3 is served in like manner through the pipe 36, which extends from the valve-box to the lower end of the cylinder. The valve-box has two exhaust ports or openings—first, the short pipe 37 near its front end, which serves to exhaust the cylinder 3 and the front end of the cylinder 2, and, second, the open rear end 38 of the valve-box itself, which serves to exhaust the rear end of the cylinder 2. The compressed air is supplied to the valve-box from the pipe 27 by two branch or connecting pipes 39 and 40.

The valve 29 controls the pipe or port 34, which communicates with rear end of the cylinder 2. When it is in its back position, as in Fig. 2, it permits the air from the pipe 39 to pass into the cylinder and force the piston 7 forward, and when it is in its front position, as in Fig. 3, it permits the rear end of the cylinder to exhaust through pipe 34 and opening 38. The valve 30 controls the pipe or port 35, which communicates with the front end of the cylinder 2. When it is in its back position, as in Fig. 2, it permits the front end of the cylinder to exhaust through the pipe 35 and port 37, and when it is in its front position, as in Fig. 3, it permits the air from the pipe 39 to pass into the cylinder through the pipe 35 and force the piston 7 backward. The valve 31 controls the pipe 36, which communicates with the cylinder 3. When it is in its back position, as in Fig. 2, it permits the air from the pipe 40 to pass to the cylinder, and when it is in its front position, as in Fig. 3, it permits the cylinder to exhaust through pipe 36 and port 37. The valves are moved by the operator by means of the handle 34.

It is necessary in the operation of the machine that the plunger 10 should be in position directly over the mold, as shown in Fig. 2, before the mold is raised, and also that the mold should be dropped after the pressing operation before the piston is drawn backward, as otherwise the mold and plunger would interfere with each other and prevent the proper movements to be made and be liable to break or injure some of the parts. The plunger must be out of the way before the mold can be lifted to discharge the article. To accomplish these movements dissimultaneously, the distributing ports and valves are arranged as shown, so that the air shall first act on the piston 7 and then on the piston 19 in bringing the plunger and mold together and so that the exhaust of the cylinder 3 shall be opened in advance of the opening of the exhaust 38 of the cylinder 2 and the admission of air to the front end of the cylinder through the pipe 35.

The description just given of the construction and operation of the pressing-machine illustrated in Fig. 2 is equally applicable to the blowing-machine shown in Fig. 3, the construction of the latter, so far as the cylinders, ports, and valves are concerned, being identical with that shown in Fig. 2. I have therefore used the same figures of reference on the duplicate parts shown in Fig. 3, except that each reference-number is marked with the sign primus. The construction of the spindle or blowing head and of the mold, however, are different and have been marked with other figures of reference.

On the outer end of the piston-rod 8', Fig. 3, is a vertical head or hollow spindle 41, having a valve-chamber 42, in which is a valve 43 for closing the air-passage 44. This valve has a stem 45, which extends down through the passage 44 and projects below the lower end of the head. Suspended on the head is a plate or disk 46 for closing the mouth of the glass-mold and clamping its sections together. This plate is provided with a peripheral flange 47, having a beveled inner edge, which is designed to engage with the beveled outer edge 48 of the mold. The plate is also provided with openings 49 for the passage of air from the head into the mold and has a tubular projection 50 on its upper side, and is suspended on the head by means of projections or bolts 51, which extend through the sides of the tube 50 into and are capable of a vertical movement in suitable recesses in the sides of the hollow head. The passage 44 is normally closed by the valve 43; but when the mold is raised into place against the plate 46 the plate is pushed up against the head, and, coming in contact with the end of the valve-stem 45, raises the valve from its seat and permits the passage of air through the air-channel 44 and openings 49 into the blow-mold. The passage 44 extends back through the piston-rod 8' and opens into the interior of the cylinder 4, from which it receives its supply of air. The blow-mold 52 is composed of a lower section 53 and the upper section 25 of the press-mold 23, the said upper section 25 being lifted from its lower section 24 and placed on the lower section 53 of the mold 52, with the heated pressed glass-blank in it, so that the blank may be blown out into its final shape at the same heat at which it was pressed.

The operation of my improved machine is as follows: The press-mold 23 being in position as shown in Fig. 2 and the plunger 10 being out of the way, the proper quantity of plastic glass is placed in the mold. The operator then pushes the valve-rod 32 backward, opening the port or pipe 34 and permitting air to pass from pipe 39 to the cylinder 2 back of the piston 7 and to force it forward, so as to bring the plunger 10 to its exact position above the mold 23, where it is held by the pressure of air upon the piston 7 until the pressing operation is completed. The backward movement of the valve-rod also causes the valve 30 to open the pipe or port 35, leading from the front end of the cylinder 2, so that the air therein may pass freely out through the exhaust-port 37. The backward movement of the valve-rod also moves the valve 31 an interval later than the movement of the valves 29 and 30, so as to open the pipe 36 and admit the air from the pipe 40 to the cylinder 3, so as to act therein after it has acted in the cylinder 2 and to force the mold 23 upward over or upon the plunger 10. The operator then draws the valve-rod 32 forward, thereby first moving the valve 31, causing it to cut off the air from the pipe 40 and to open the pipe 36 to the exhaust 37. This permits the mold 23 to drop back to its normal position and frees the plunger 10. The forward movement of the valve-rod also causes the valve 30 to close the pipe 35 to the exhaust 37 and open it to the admission of air from the pipe 39 and to open the pipe 34 to the exhaust 38. This causes the piston 7 to move backward in the cylinder 2 and withdraw the plunger 10 from its position above the mold. This leaves the mold unobstructed, and the upper section 25, carrying with it the pressed glass-blank, Fig. 4, is then raised off of the lower section 24 and placed upon the lower section 53 of the mold 52. The blowing-head 41 is then caused to advance to its position above the mold 52, and the mold 52 is raised by the operation of the cylinder 5, so as to bring it in contact with the plate 46, which, being forced upward by the mold, opens the valve 43, thereby admitting the air from the air-passage 44 into the mold and blowing the article out to its final shape, as shown in Fig. 5. In this operation the inclined surfaces 47 of the plate 46, acting upon the inclined surfaces 48 of the mold, clamp the hinged sections of the mold together, so that it is not necessary to key them, as has been the practice in the use of blow-molds. The plate also clamps the upper section 25 upon the lower section 53 firmly against the air-pressure inside of the mold, and thereby prevents the separation of the sections and the formation of fins at the joints of the mold. These movements of the blow-head 41 and mold 52 are secured by pushing the valve-stem 32' backward, precisely as has been described with reference to Fig. 2. The valve-rod 32' is then drawn forward, reversing the valves and causing the mold 52 to drop, and then the blow-head to be drawn backward, as has been described with reference to the corresponding parts in Fig. 2. The upper section 25 of the mold is then opened and the article removed in the usual way.

The rod 20 is provided with an adjusting-sleeve 55, by which its length can be varied to adapt the machine to be used with molds of different heights.

Choke-valves 54 can be used on the various supply-pipes to regulate the pressure.

The heads 21 21' move in guides 22 to cause the molds to register accurately with the blowing head or plunger with which they are used.

If preferred, the air may be admitted to the blowing-head 41 by means of a flexible tube or pipe attached thereto, in which case the air-passage through the piston-rod 8' may be dispensed with; also, the automatic valve 43 may be dispensed with and a hand-valve arranged in the head 41 or in the air-pipe leading thereto to be used to control the admission of air to the mold. These modifications will be easily understood by the skilled mechanic.

The particular article shown, Fig. 5, is a vaseline-bottle; but the machine can be used for the manufacture of many different varieties of articles having molded mouths and enlarged bodies by merely adapting the molds and plunger and blowing-head and the movements of the same to the size and shape of the article desired. The normal or back position of the plunger is such as to leave the mouth of the press-mold unobstructed, so that the plastic glass may be placed therein with ease and quickness and the top section of the mold with the article therein can be lifted off without interfering with or striking the plunger. In like manner the normal or back position of the blowing-head 41 permits the article to be placed in and taken out of the blow-mold without interference. The use of pneumatic pressure for thus accomplishing the various operations of assembling the operative parts, pressing the blank, blowing the article, and dissembling the parts insures greater rapidity and certainty of operation, secures the use of any desired amount of power without labor on the part of the operator, and results in a greatly-increased and uniform output of highly-finished ware at a very low cost.

What I claim as my invention is—

1. The combination, in a machine for forming glass articles, of a head or plunger and mechanism for moving it to and from an operative position, with a mold and mechanism for moving the mold against or onto the head or plunger and withdrawing it while the latter is held stationary, substantially as and for the purposes described.

2. The combination, in a machine for forming glassware, of a head or plunger and a pneumatic cylinder and piston for moving it to and from an operative position, with a mold and a pneumatic cylinder and piston for moving it against or onto the head or plunger and withdrawing it while the latter is held stationary, substantially as and for the purposes described.

3. The combination, in a machine for forming glassware, of a pneumatic cylinder and piston for moving a head or plunger to and from an operative position, a pneumatic cylinder and piston for moving a mold against or onto the head or plunger, a valve-box common to both cylinders, and valves operated by a common valve-rod for controlling the supply and exhaust ports leading to the cylinders, substantially as and for the purposes described.

4. In combination with a pneumatic cylinder for moving the head or plunger to and from its operative position, a piston 7, having a guide-rod extending through the rear end of the cylinder and provided with a threaded end, and adjusting-nuts for determining the length of the stroke of the piston, substantially as and for the purposes described.

5. The combination of the clamping-plate 46, having a beveled flange 47, with a sectional glass-mold having a beveled edge 48, substantially as and for the purposes described.

In testimony whereof I have hereunto set my hand this 22d day of April, 1891.

DANIEL C. RIPLEY.

Witnesses:
R. H. WHITTLESEY,
THOMAS B. KERR.